US012513455B2

(12) United States Patent
Kawamura et al.

(10) Patent No.: US 12,513,455 B2
(45) Date of Patent: Dec. 30, 2025

(54) AUDIO DEVICE

(71) Applicant: Panasonic Intellectual Property Corporation of America, Torrance, CA (US)

(72) Inventors: Akihisa Kawamura, Osaka (JP); Shuji Saiki, Nara (JP); Satoshi Takayama, Mie (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 252 days.

(21) Appl. No.: 18/139,599

(22) Filed: Apr. 26, 2023

(65) Prior Publication Data

US 2023/0269527 A1 Aug. 24, 2023

Related U.S. Application Data

(63) Continuation of application No. PCT/JP2021/038691, filed on Oct. 20, 2021.

(30) Foreign Application Priority Data

Nov. 13, 2020 (JP) ................................ 2020-189616

(51) Int. Cl.
*H04R 1/28* (2006.01)
*H04R 1/02* (2006.01)
*H04R 1/34* (2006.01)

(52) U.S. Cl.
CPC ........... *H04R 1/2857* (2013.01); *H04R 1/025* (2013.01); *H04R 1/2811* (2013.01); *H04R 1/345* (2013.01)

(58) Field of Classification Search
CPC ...... H04R 1/28; H04R 1/2803; H04R 1/2807; H04R 1/2811; H04R 1/2815;
(Continued)

(56) References Cited

U.S. PATENT DOCUMENTS 2,866,514 A * 12/1958 Weathers ............. H04R 1/2888 181/151
4,135,600 A * 1/1979 Ogi ...................... H04R 1/2826 181/156
(Continued)

FOREIGN PATENT DOCUMENTS

GB 921213 9/1963
JP H1013982 A * 1/1998 ............... H04R 1/28
(Continued)

OTHER PUBLICATIONS

International Search Report (ISR) issued on Jan. 11, 2022 in International (PCT) Application No. PCT/JP2021/038691.
(Continued)

*Primary Examiner* — Edgardo San Martin
(74) *Attorney, Agent, or Firm* — Wenderoth, Lind & Ponack, L.L.P.

(57) ABSTRACT

An audio device includes a plurality of reflective components that reflect sound emitted from a loudspeaker unit. The audio device forms a reflective space surrounded by the plurality of reflective components. The audio device includes an acoustic channel that is tube-shaped and includes an opening on one end and a terminating portion on an other end, the one end being connected to a communication hole provided in a reflective component among the plurality of reflective components, and a sound absorbing material disposed at a central portion of a sound path formed by the acoustic channel.

13 Claims, 8 Drawing Sheets

(58) Field of Classification Search
CPC .. H04R 1/2819; H04R 1/2823; H04R 1/2826; H04R 1/2834; H04R 1/2842; H04R 1/2846; H04R 1/2853; H04R 1/2857; H04R 1/2869; H04R 1/2873; H04R 1/2876; H04R 1/288
See application file for complete search history.

(56) References Cited

U.S. PATENT DOCUMENTS

| | | | | | |
|---|---|---|---|---|---|
| 4,224,469 | A * | 9/1980 | Karson | H04R 5/02 | 381/349 |
| 4,837,837 | A * | 6/1989 | Taddeo | H04R 1/2819 | 181/146 |
| 4,930,596 | A * | 6/1990 | Saiki | H04R 1/2857 | 181/185 |
| 5,333,204 | A * | 7/1994 | Hamada | H04R 1/2826 | 381/349 |
| 5,373,564 | A * | 12/1994 | Spear | H04R 1/2857 | 381/349 |
| 6,002,781 | A * | 12/1999 | Takayama | H04R 1/2857 | 381/345 |
| 6,278,789 | B1 * | 8/2001 | Potter | H04R 1/2857 | 381/337 |
| 6,324,292 | B1 | 11/2001 | Mitsuhashi et al. | | |
| 6,356,643 | B2 * | 3/2002 | Yamagishi | H04R 1/2857 | 381/349 |
| 6,700,984 | B1 * | 3/2004 | Holberg | H04R 1/2857 | 381/337 |
| 6,771,787 | B1 * | 8/2004 | Hoefler | H04R 1/345 | 381/345 |
| 6,912,290 | B1 * | 6/2005 | Thorsell | H04R 1/2826 | 181/185 |
| 7,269,270 | B2 * | 9/2007 | Freeman | H04R 3/005 | 381/345 |
| 7,614,479 | B2 * | 11/2009 | Plummer | H04R 1/2857 | 381/345 |
| 7,748,495 | B2 * | 7/2010 | Krueger | H04R 1/2857 | 381/338 |
| 8,678,130 | B2 * | 3/2014 | Shiozawa | H04R 1/2873 | 181/175 |
| 8,699,738 | B2 * | 4/2014 | Saiki | H04R 1/288 | 381/349 |
| 9,414,151 | B2 * | 8/2016 | Kano | H04R 1/28 | |
| 9,473,847 | B2 * | 10/2016 | Shiozawa | H04R 1/20 | |
| 10,735,852 | B2 * | 8/2020 | Matsumura | H04R 1/2819 | |
| 2012/0300967 | A1 | 11/2012 | Saiki | | |
| 2013/0062139 | A1 | 3/2013 | Shiozawa et al. | | |
| 2014/0254839 | A1 | 9/2014 | Shiozawa et al. | | |

FOREIGN PATENT DOCUMENTS

| | | | | |
|---|---|---|---|---|
| JP | 2769448 | B2 * | 6/1998 | H04R 1/28 |
| JP | 2000-125387 | | 4/2000 | |
| JP | 3763682 | | 4/2006 | |
| JP | 2008-211389 | | 9/2008 | |
| JP | 2014-175807 | | 9/2014 | |
| JP | 2015026888 | A * | 2/2015 | H04R 1/28 |
| JP | 2017-55435 | | 3/2017 | |
| KR | 970032261 | A * | 6/1997 | H04R 1/2857 |
| WO | 2008/102516 | | 8/2008 | |
| WO | 2012/073431 | | 6/2012 | |

OTHER PUBLICATIONS

Extended European Search Report issued Mar. 5, 2024 in corresponding European Patent Application No. 21891607.0.

* cited by examiner (a)

(b)

(c)

(d)

AUDIO DEVICE

CROSS REFERENCE TO RELATED APPLICATION

This is a continuation application of PCT International Application No. PCT/JP2021/038691 filed on Oct. 20, 2021, designating the United States of America, which is based on and claims priority of Japanese Patent Application No. 2020-189616 filed on Nov. 13, 2020. The entire disclosures of the above-identified applications, including the specifications, drawings and claims are incorporated herein by reference in their entirety.

FIELD

The present disclosure relates to an audio device that suppresses distortion in sound pressure frequency response caused by standing waves occurring within a space.

BACKGROUND

It is known that the internal shape of a loudspeaker cabinet or the internal shape of a listening room can cause distortion in the sound pressure frequency response of sound emitted from a loudspeaker unit. To correct such distortion in sound pressure frequency response, Patent Literature (PTL) 1 describes a technique in which an acoustic channel that communicates with a reflective space is provided in a loudspeaker cabinet in order to suppress the effects of standing waves occurring in the reflective space.

CITATION LIST

Patent Literature

PTL 1: WO 2012/073431

SUMMARY

Technical Problem

However, although the technique described in PTL 1 can suppress peaks in sound pressure at resonant frequencies through resonance occurring between the acoustic channel and the reflective space of the cabinet, the technique does not directly suppress dips in sound pressure frequency response.

The present disclosure provides an audio device capable of achieving a sound pressure frequency response that has few dips and is as flat as possible.

Solution to Problem

An audio device according to one aspect of the present disclosure is an audio device including a plurality of reflective components that reflect sound emitted from a loudspeaker unit, the audio device forming a reflective space surrounded by the plurality of reflective components, the audio device including: an acoustic channel that is tube-shaped and includes an opening on one end and a terminating portion on an other end, the one end being connected to a communication hole provided in a reflective component among the plurality of reflective components; and a sound absorbing material disposed at a central portion of a sound path formed by the acoustic channel.

Advantageous Effects

According to the present disclosure, the sound absorbing material provided in the central portion of the acoustic channel can effectively suppress the amplitude of standing waves occurring within a reflective space, and thereby make it possible to flatten sound pressure frequency response.

DESCRIPTION OF EMBODIMENT

Hereinafter, an audio device according to the present disclosure will be described with reference to the drawings. It should be noted that the following embodiment is merely an example for describing the present disclosure, and is not intended to limit the scope of the present disclosure. For example, the shapes, structures, materials, elements, relative positional relationships, connection states, numerical values, formulas, and details of each of the steps and the order of the steps of the methods, and the like, described in the following embodiment are mere examples, and may include details that are not included in the following descriptions. Furthermore, although geometric expressions, such as "parallel" and "orthogonal", may be used, these expressions are not mathematically precise indications and include substantially permissible error, deviation, and the like. Moreover, expressions, such as "simultaneous" and "identical (or the same)", are considered to cover a substantially permissible range of meaning.

Additionally, the drawings are schematic illustrations, which may include emphasis, omission, or adjustment of proportion as necessary for the purpose of illustrating the present disclosure, and thus the shapes, positional relationships, and proportions shown may be different from actuality.

Furthermore, hereinafter, multiple aspects of the present disclosure may be comprehensively described as a single embodiment. Moreover, part of the contents in the description below describes optional elements related to the present disclosure.

Figure 1:
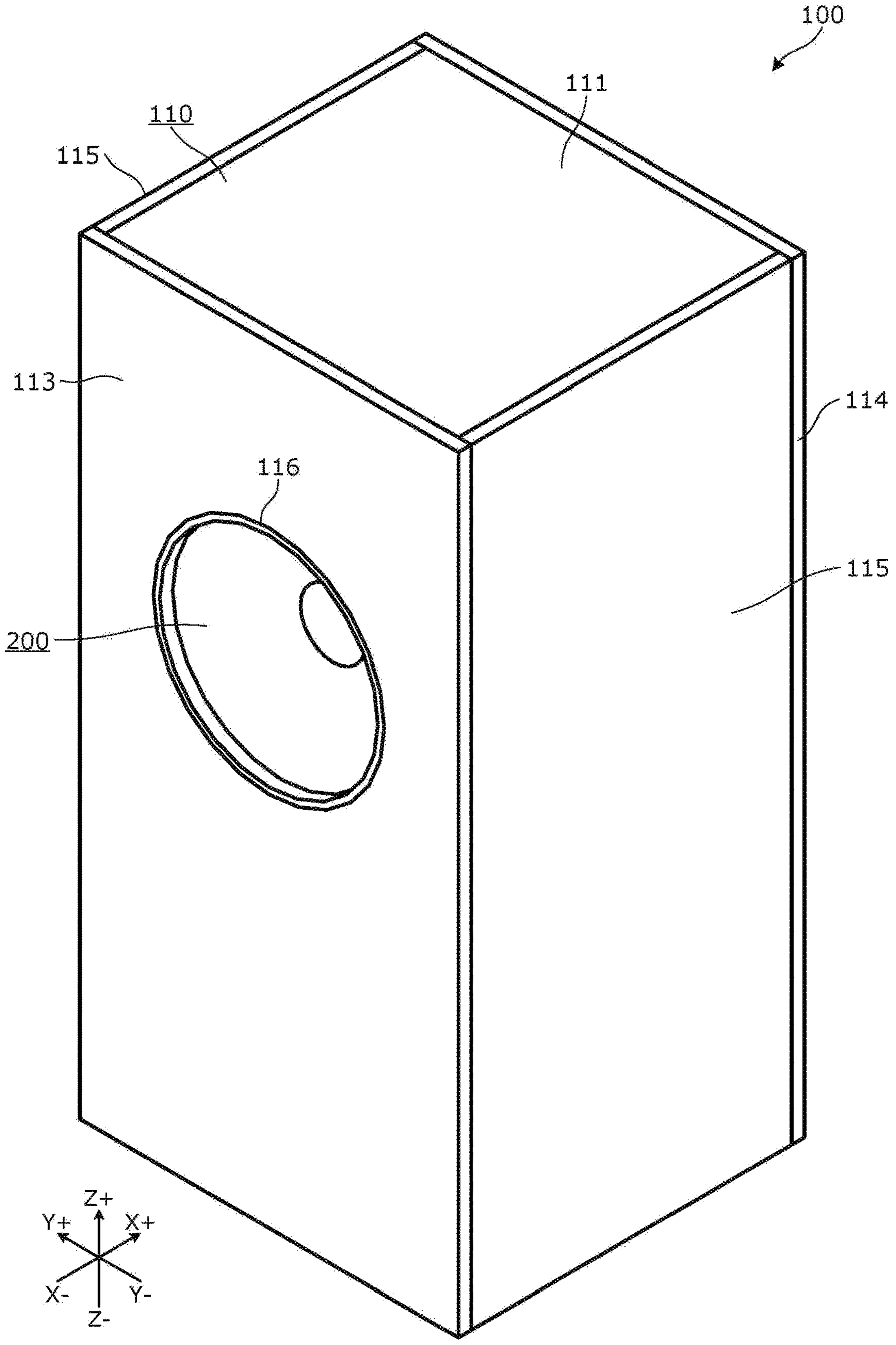
FIG. 1 is a perspective view of the external appearance of an audio device according to an embodiment.
Figure 2:
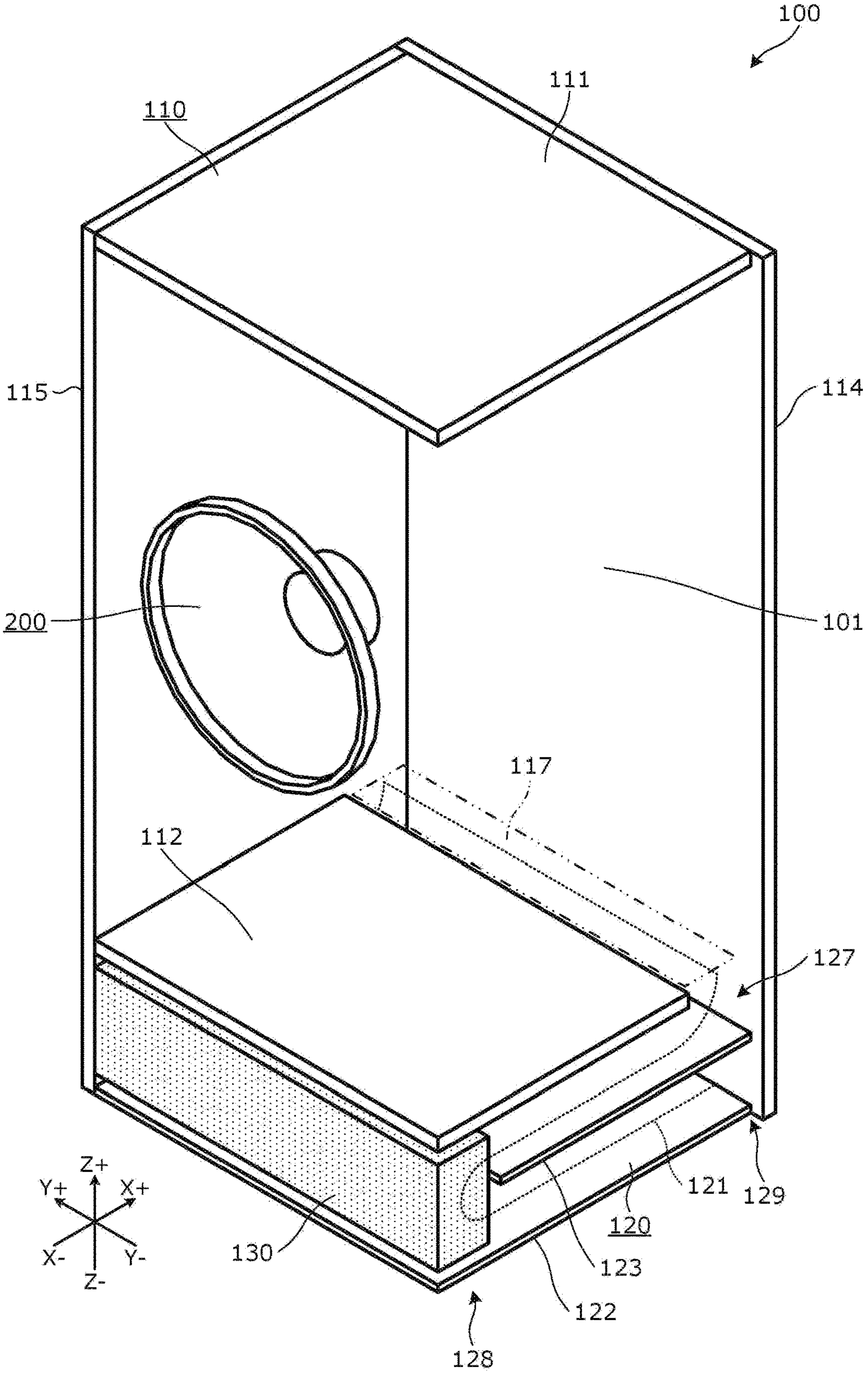
FIG. 2 is a perspective view illustrating the audio device according to the embodiment with a portion of the reflective components omitted.

FIG. 1 is a perspective view of the external appearance of an audio device according to an embodiment. FIG. 2 is a perspective view with a portion of the reflective components omitted illustrating the audio device according to the embodiment.

Audio device 100 according to the embodiment is a loudspeaker cabinet in a so-called loudspeaker system, and loudspeaker unit 200 is mounted to the device. Audio device 100 includes reflective components 110, acoustic channel 120, and sound absorbing material 130.

Loudspeaker unit 200 is an electroacoustic conversion device that converts electrical signals, such as audio signals, into the vibrations of a diaphragm. The size, shape, and structure of the diaphragm, magnetic circuit, and frame, and the like, which loudspeaker unit 200 is composed of are not particularly limited. In the present embodiment, an electrodynamic loudspeaker that includes a cone-shaped diaphragm is used for loudspeaker unit 200.

Reflective components 110 are components that reflect sound that is output from loudspeaker unit 200. The space surrounded by reflective components 110 is a reflective space in which the sound that is output by loudspeaker unit 200 is reflected. In the present embodiment, reflective components 110 are a plurality of board-shaped reflective components 110 that include top panel 111, bottom panel 112, front panel 113, rear panel 114, and two side panels 115, which are assembled in a rectangular-cuboid shape to form a rectangular cuboid-shaped reflective space 101. Mounting hole 116 is provided penetrating through front panel 113 that is one of reflective components 110, and loudspeaker unit 200 is mounted by being inserted into mounting hole 116. Communication hole 117 is provided penetrating through bottom panel 112 that is one of reflective components 110, thereby bringing reflective space 101 and sound path 121 into communication with each other. Specifically, bottom panel 112 is shorter than top panel 111 in the depth-wise direction (X-axis direction in the figure), and the space surrounded by bottom panel 112, rear panel 114, and both side panels 115 defines communication hole 117.

There are no particular limitations on the material of reflective components 110, and examples include wood, resin, building materials, and ceramics, and the like, and multiple materials may be combined.

Acoustic channel 120 is a tube-shaped portion that includes opening 127 on one end and terminating portion 129 on the other end, and acoustic channel 120 is a portion that forms sound path 121 that communicates with reflective space 101 formed by reflective components 110. The length of sound path 121 formed by acoustic channel 120 is not particularly limited and may be determined by the position of a dip occurring in sound pressure frequency response, or the like, due to distortion caused by the effects of reflective space 101 formed by reflective components 110, for example. For example, when a dip occurs in sound pressure frequency response due to a standing wave resulting as a product of the length of distance from the reflective component 110 disposed opposite communication hole 117 to communication hole 117, which in the present embodiment is the length of distance from top panel 111 to bottom panel 112, acoustic channel 120 is set that forms sound path 121 having a length that is at least 50% of the length of distance from the reflective component 110 disposed opposite communication hole 117 to communication hole 117. In the present embodiment, the length of sound path 121 is set to be the same as the length of distance from top panel 111 to bottom panel 112.

Sound absorbing material 130 is a component disposed at central portion 128 of sound path 121 formed by acoustic channel 120. There are no particular limitations on sound absorbing material 130 as long as the material can suppress vibrations in the air, and examples include an open-cell, sponge-like sound absorbing material 130, as well as a wool-type sound absorbing material 130 that is an aggregate of fiberglass and mineral wool, and the like. The position of sound absorbing material 130 is not particularly limited as long as it is at a central portion of sound path 121. For example, sound absorbing material 130 may be disposed so as to obstruct acoustic channel 120, or sound absorbing material 130 may be attached to the inner surface of acoustic channel 120 so as not to obstruct acoustic channel 120. It should be noted that when sound absorbing material 130 is disposed in the vicinity of opening 127 of acoustic channel 120, the remedial effect on dips in sound pressure frequency response is poor. Furthermore, when sound absorbing material 130 is disposed in the vicinity of terminating portion 129 of acoustic channel 120, the remedial effect on dips in sound pressure frequency response is poor, and such placement is considered undesirable as it may cause new dips to occur.

In other words, the placement position of sound absorbing material 130 inside of acoustic channel 120 can be said to constitute a region that includes a portion within acoustic channel 120 that has high particle velocity. Specifically, acoustic channel 120 forms a sound path 121 of a length equivalent to or close to half a wavelength of the standing wave occurring within reflective space 101 that causes the dip to occur. In this manner, a standing wave that vibrates in unison in the same frequency as the standing wave in reflective space 101 can be generated within acoustic channel 120. When sound absorbing material 130 is disposed at a central portion of sound path 121, vibrations can be suppressed at the portion in acoustic channel 120 at which the particle velocity of standing waves is highest, and thus standing waves can effectively be suppressed.

Consequently, the dip to be suppressed can selectively be suppressed without affecting sound pressure frequency response for other frequencies particularly the lower frequencies.

Figure 3:
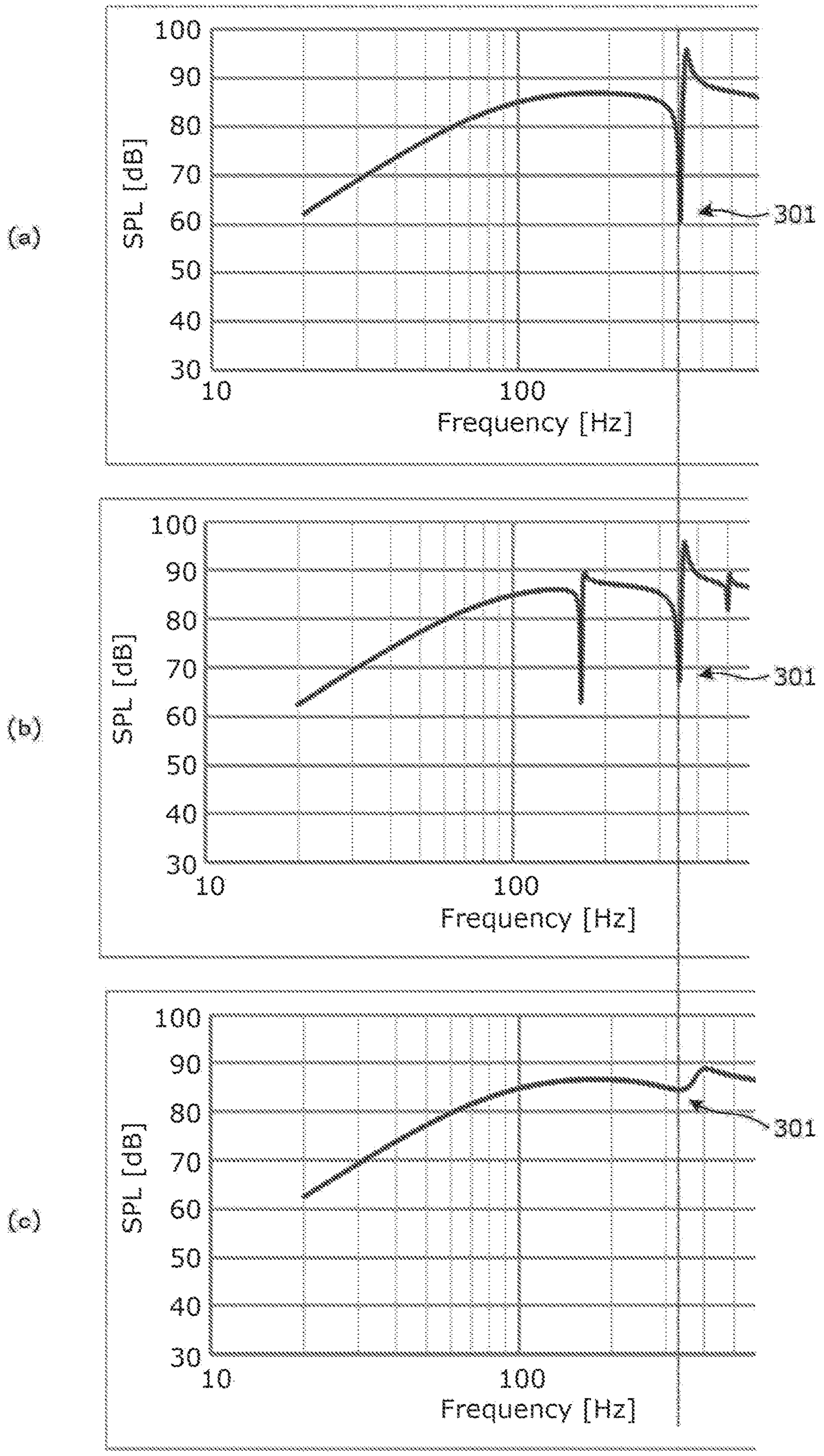
FIG. 3 shows graphs illustrating sound pressure frequency response depending on the presence or lack of an acoustic channel and/or a sound absorbing material.

Examples of the operation of audio device 100 having a configuration as shown above will be described using the sound pressure frequency responses graphs illustrated in FIG. 3. (a) in FIG. 3 illustrates the sound pressure frequency response of an audio device 100 in which acoustic channel 120 is not provided, and in which communication hole 117 is not provided in reflective component 110. (b) in FIG. 3 illustrates the sound pressure frequency response of an audio device 100 in which acoustic channel 120 is connected to communication hole 117 of reflective component 110, and in which sound absorbing material 130 is not provided. (c) in FIG. 3 illustrates the sound pressure frequency response of audio device 100 according to the present embodiment.

As illustrated in (a) in FIG. 3, in the sound pressure frequency response of a conventional, enclosed audio device in which acoustic channel 120 is not provided, sound pressure dip 301 occurs in the vicinity of 350 Hz. This is thought to be caused by a 350 Hz standing wave occurring in reflective space 101.

Next, as illustrated in (b) in FIG. 3, in the sound pressure frequency response in the case where acoustic channel 120 is attached to communication hole 117 of reflective component 110, and sound absorbing material 130 is not provided, dips other than dip 301 also occur because acoustic channel 120 is connected to a rectangular cuboid-shaped reflective space 101. Sound pressure frequency response becomes more distorted than when acoustic channel 120 is not provided.

In the present embodiment illustrated in (c) in FIG. 3, dip 301 that occurs when acoustic channel 120 is not provided ((a) in FIG. 3) is significantly remedied, and sound pressure frequency response is smooth. Furthermore, the peak occurring in the higher frequency-side vicinity of dip 301 is also suppressed. Moreover, dips other than dip 301 that occur due to the presence of acoustic channel 120 are eliminated, and practically no effects can be observed in sound pressure frequency response on the lower frequency-side relative to dip 301.

Figure 4:
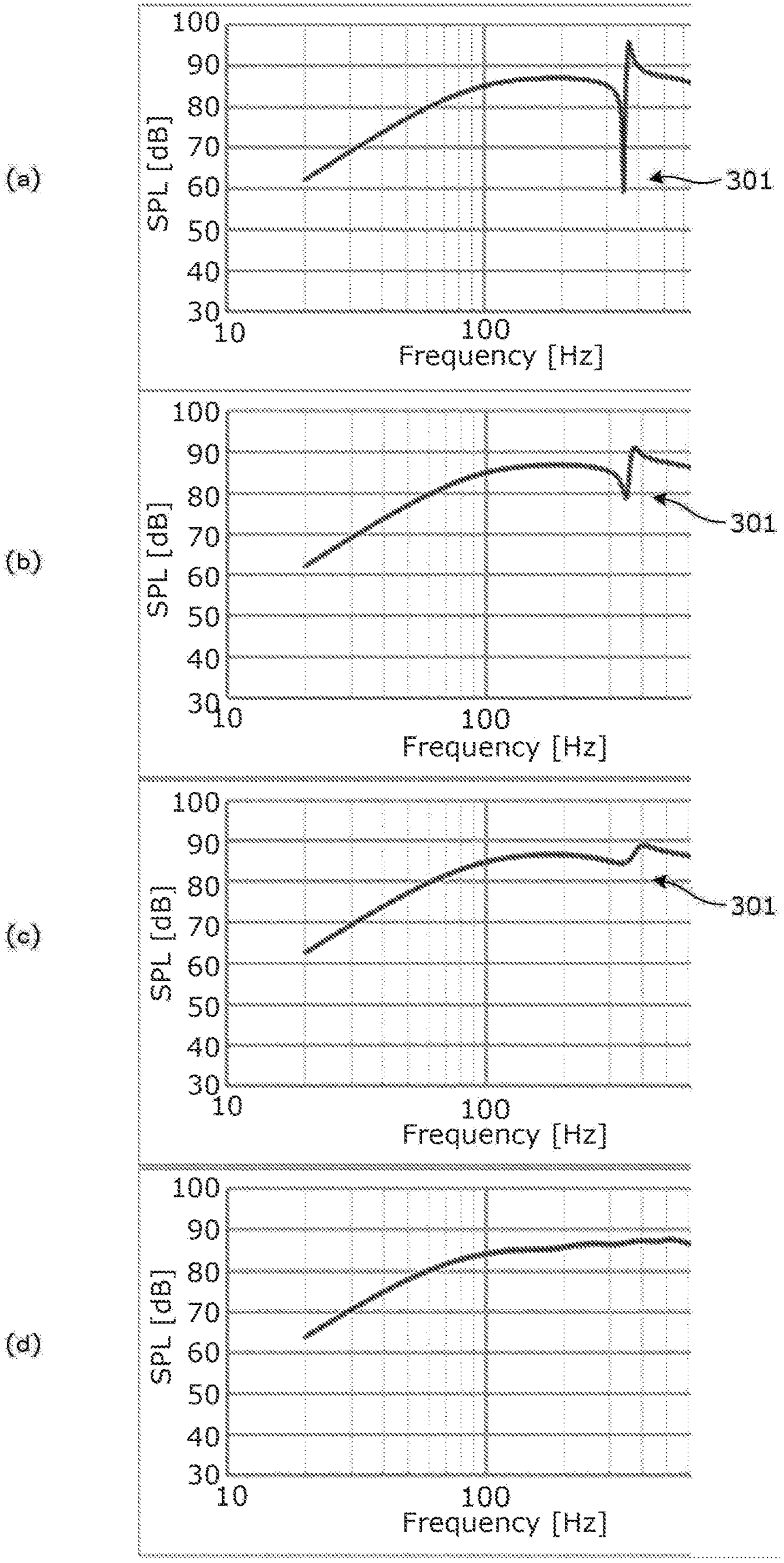
FIG. 4 shows graphs illustrating sound pressure frequency response for communication holes with different aperture areas.

Next, the effects of the aperture area of communication hole 117 on sound pressure frequency response will be described. It is preferable that the aperture area of communication hole 117 is within a range of from 5% to 50% of the surface area of the reflective component 110 on which communication hole 117 is provided (specifically, the surface area of such reflective component 110 when communication hole 117 is not provided) (see FIG. 4). The graph illustrated in (a) in FIG. 4 shows the sound pressure frequency response when the aperture area of communication hole 117 is less than 5% (specifically, 1%). This illustrates that it is difficult to suppress dip 301 with a communication hole 117 having such an aperture area. The graph illustrated in (b) in FIG. 4 shows the sound pressure frequency response when the aperture area of communication hole 117 is 5%. A communication hole 117 with such an aperture area can suppress dip 301 in the sound pressure frequency response. The graph illustrated in (c) in FIG. 4 shows the sound pressure frequency response when the aperture area of communication hole 117 is 10%. A communication hole 117 having such an aperture area can further suppress dip 301 in the sound pressure frequency response. The graph illustrated in (d) in FIG. 4 shows the sound pressure frequency response when the aperture area of communication hole 117 is 50%. For a communication hole 117 having such an aperture area, the vicinity of dip 301, which is the target to be suppressed, can be rendered virtually flat. It should be noted that an aperture area of communication hole 117 larger than 50% would not be practical since the volume of the box that includes acoustic channel 120 would become large.

Figure 5:
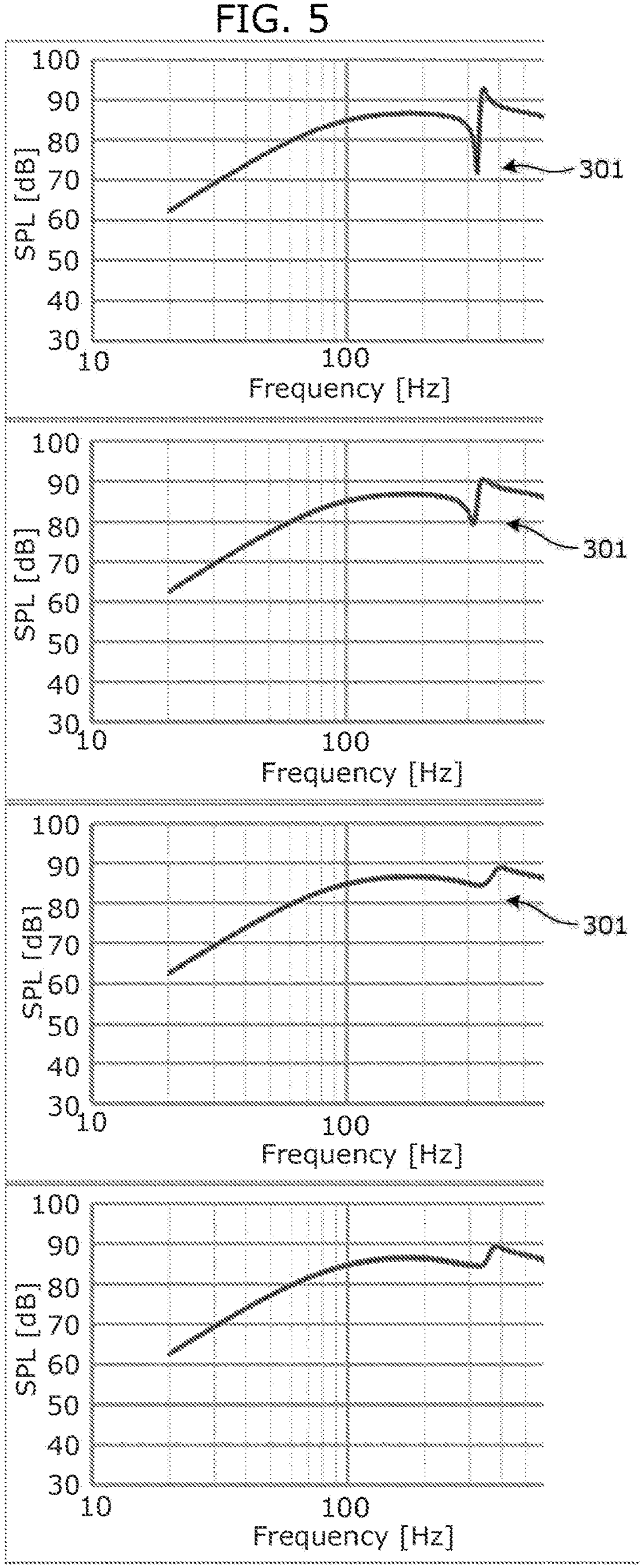
FIG. 5 shows graphs illustrating sound pressure frequency response for sound paths with different lengths.

Next, the effects of the length of sound path 121, which is formed by acoustic channel 120, on sound pressure frequency response will be described. FIG. 5 shows graphs illustrating sound pressure frequency response for sound paths with different lengths. When the length of sound path 121 is less than 50% of half a wavelength (for example, 25% of half a wavelength in (a) in FIG. 5) that corresponds to dip 301 that is the target to be suppressed in the sound pressure frequency response, practically no remedial effect is seen for dip 301. As illustrated in (b) in FIG. 5, when the length is 50% of half a wavelength, dip 301 that is the target to be suppressed becomes shallower, and thus a remedial effect can be observed. When the length is equal to half a wavelength ((c) in FIG. 5), as in the present embodiment, dip 301 becomes shallow. On the other hand, even when the length of sound path 121 is set longer than half a wavelength (for example, 125% of half a wavelength in (d) in FIG. 5), there is no change in the shallowness of dip 301 compared to when the length is equal to half a wavelength. That is to say, it is preferable that the length of sound path 121 is set to at least 50% of half a wavelength that corresponds to dip 301 that is the target to be suppressed. It should be noted that the specific length is set based on distortion of the sound pressure frequency response in other frequency ranges.

As described above, according to the present embodiment, by placing acoustic channel 120, which forms sound path 121 in which sound absorbing material 130 is disposed at central portion 128, at communication hole 117 provided in reflective component 110, it is possible to suppress standing waves, which occur due to the relationship between the distance separating reflective components 110 located opposite each other in reflective space 101 and the wavelength of sound emitted by loudspeaker unit 200. Furthermore, for low-frequency ranges lower than the frequency of the standing wave, the volume of acoustic channel 120, in which sound absorbing material 130 is disposed at a central portion of sound path 121, is added to the volume of reflective space 101, and thus the effects on sound pressure levels for low-frequency ranges can be suppressed.

It should be noted that the scope of the present disclosure is not limited to the above embodiment. For example, other embodiments realized by arbitrarily combining elements recited in the present Description or by omitting one or more of the elements may be included as an embodiment of the present disclosure. Moreover, variations resulting from various modifications to the above embodiment that can be conceived by those skilled in the art, so long as they do not depart from the essence of the present disclosure, that is, the intended meaning of the language of the appended claims, are included within the scope of the present disclosure.

Figure 6:
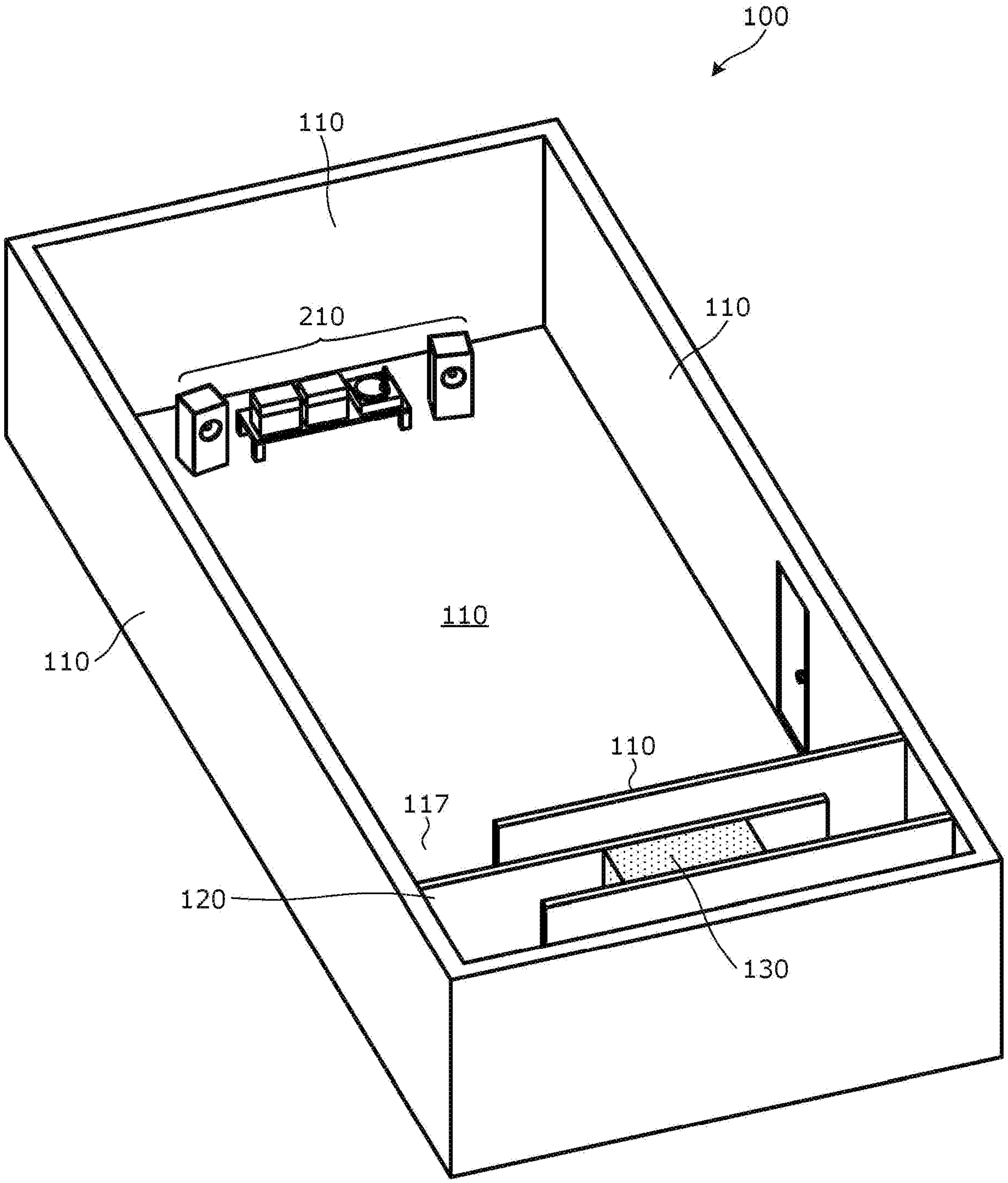
FIG. 6 is a perspective view illustrating Example 1 of the audio device with a portion of the reflective components omitted.

Although a loudspeaker cabinet in a loudspeaker system was provided as an example of audio device 100 in the embodiment above, audio device 100 is not limited to a cabinet. For example, as illustrated in FIG. 6, audio device 100 may be a listening room in which stereo system 210 that includes a loudspeaker system is disposed. In this case, the building material that the walls, floor, and ceiling, and the like, is composed of functions as reflective components 110.

Furthermore, the shape of acoustic channel 120 is not particularly limited, and it may be of any shape, such as a cylindrical shape or a rectangular-tube shape. Furthermore, the shape of sound path 121 formed by acoustic channel 120 may be straight, curved, or bent. In the present embodiment, acoustic channel 120 is rectangular-tube shaped, and sound path 121 formed by acoustic channel 120 is bent in a U-shaped manner. The material forming acoustic channel 120 is not particularly limited and may be a material that is different from reflective components 110. In the present embodiment, acoustic channel 120 is formed by the extended portions of front panel 113, rear panel 114, and both side panels 115, as well as acoustic channel board 122, partition panel 123, and bottom panel 112, which is used for both the reflective space and the acoustic channel.

Figure 7:
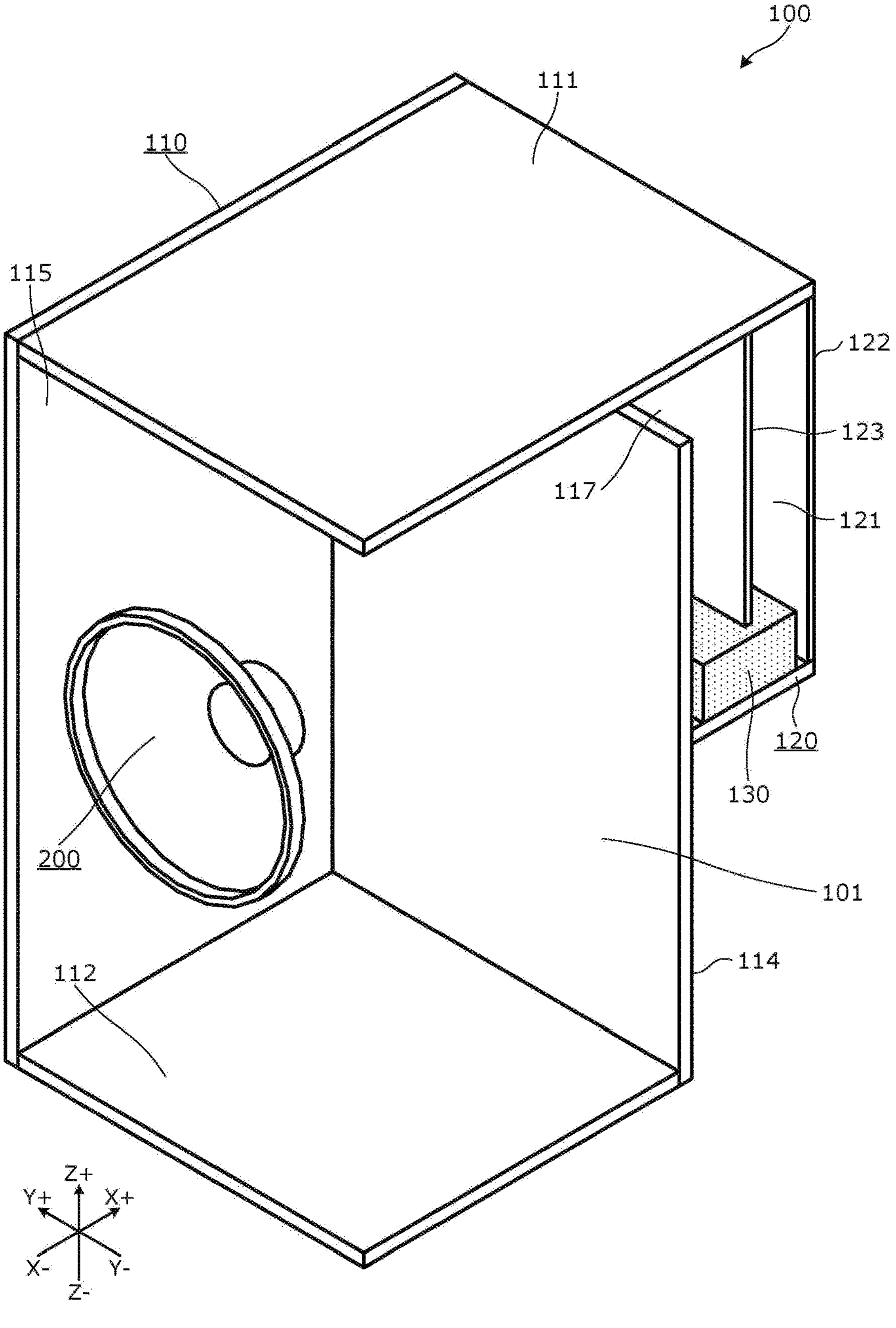
FIG. 7 is a perspective view illustrating Example 2 of the audio device with a portion of the reflective components omitted.

Furthermore, in the above-mentioned embodiment, the length of sound path 121 formed by acoustic channel 120 is determined based on the length of distance from the reflective component 110 disposed opposite communication hole 117 to communication hole 117. However, acoustic channel 120, which forms sound path 121 having a length that corresponds to the standing wave that occurs based on the distance between top panel 111 and bottom panel 112, may be connected to communication hole 117 provided in rear panel 114, as shown in FIG. 7.

Figure 8:
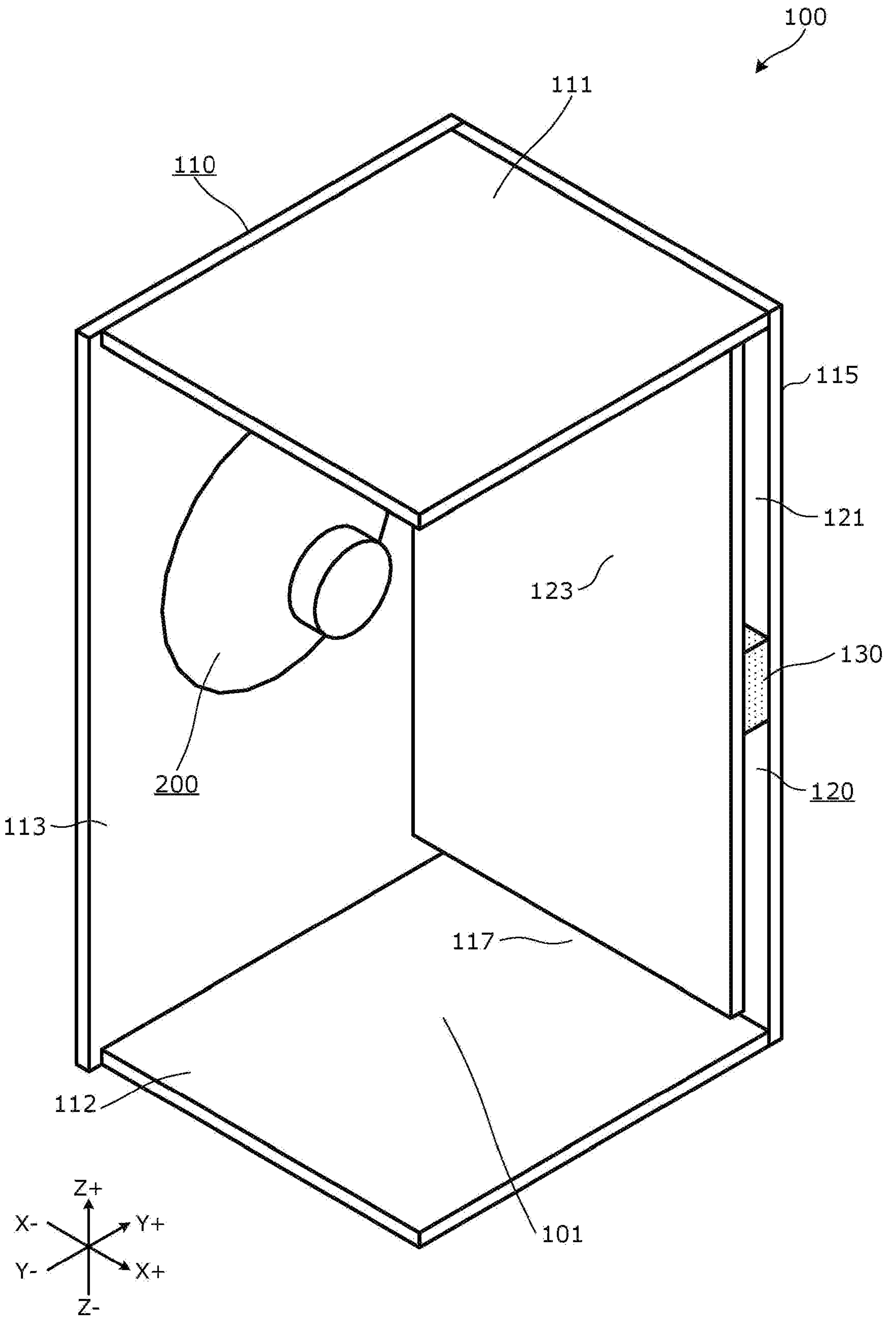
FIG. 8 is a perspective view illustrating Example 3 of the audio device with a portion of the reflective components omitted.

Moreover, although a bent sound path 121 was described in the above-mentioned embodiment, a straight-tube shaped sound path 121, as illustrated in FIG. 8, may be provided. Furthermore, acoustic channel 120, which forms sound path 121, may be provided by using partition panel 123 inside a cabinet formed by reflective components 110.

Additionally, acoustic channel 120 may be connected by providing communication hole 117 in at least one of side panel 115 or top panel 111.

Furthermore, each of a plurality of acoustic channels 120 that form sound paths 121 of different lengths may be connected to a plurality of communication holes 117 provided in reflective components 110.

Moreover, a bass reflex port different from communication hole 117 may be provided in reflective component 110, and holes that are in communication with reflective space 101 other than communication hole 117 may be provided.

INDUSTRIAL APPLICABILITY

The present disclosure is applicable to a cabinet in a loudspeaker system, a housing of a household appliance, such as a television, in which a loudspeaker unit is mounted, as well as a listening room and music practice studio, and the like.

The invention claimed is:

1. An audio device including a plurality of reflective components that reflect sound emitted from a loudspeaker unit, the audio device forming a reflective space surrounded by the plurality of reflective components, the audio device comprising:

an acoustic channel that is tube-shaped and includes an opening on one end and a terminating portion on an other end, the one end being connected to a communication hole provided in a reflective component among the plurality of reflective components; and a sound absorbing material disposed at a central portion of a sound path formed by the acoustic channel, the sound absorbing material being a material that suppresses vibrations in air, wherein the terminating portion completely closes off the other end of the acoustic channel.

2. The audio device according to claim 1, wherein a length of the sound path formed by the acoustic channel is at least 50 percent of a length of distance between any pair of mutually opposed reflective components among the plurality of reflective components, the pair of mutually opposed reflective components including the reflective component provided with the communication hole.

3. The audio device according to claim 1, wherein an aperture area of the communication hole is a surface area that is within a range of from 5 percent to less than 50 percent of a surface area of the reflective component in which the communication hole is provided.

4. The audio device according to claim 1, further comprising:

the loudspeaker unit that is mounted by being inserted in a mounting hole provided penetrating through a reflective component among the plurality of reflective components.

5. The audio device according to claim 1, wherein a length of the sound path is at least 50 percent of half a wavelength of a standing wave occurring within the reflective space, the standing wave causing a sound pressure dip to occur.

6. The audio device according to claim 2, wherein a length of the sound path is at least 50 percent of half a wavelength of a standing wave occurring within the reflective space, the standing wave causing a sound pressure dip to occur.

7. The audio device according to claim 3, wherein a length of the sound path is at least 50 percent of half a wavelength of a standing wave occurring within the reflective space, the standing wave causing a sound pressure dip to occur.

8. The audio device according to claim 4, wherein a length of the sound path is at least 50 percent of half a wavelength of a standing wave occurring within the reflective space, the standing wave causing a sound pressure dip to occur.

9. The audio device according to claim 1, wherein the sound absorbing material is disposed at the central portion of the sound path to obstruct the acoustic channel.

10. The audio device according to claim 2, wherein the sound absorbing material is disposed at the central portion of the sound path to obstruct the acoustic channel.

11. The audio device according to claim 3, wherein the sound absorbing material is disposed at the central portion of the sound path to obstruct the acoustic channel.

12. The audio device according to claim 4, wherein the sound absorbing material is disposed at the central portion of the sound path to obstruct the acoustic channel.

13. The audio device according to claim 5, wherein the sound absorbing material is disposed at the central portion of the sound path to obstruct the acoustic channel.

* * * * *